United States Patent [19]
Davis et al.

[11] Patent Number: 5,091,029
[45] Date of Patent: Feb. 25, 1992

[54] METHOD OF MANUFACTURING A UNITARY, MULTI-LEGGED HELICOPTER ROTOR FLEXBEAM MADE SOLELY OF COMPOSITE MATERIALS

[75] Inventors: Geoffrey C. R. Davis, Madison; Allen J. McIntire, Ansonia, both of Conn.

[73] Assignee: United Technologies Corporation, Hartford, Conn.

[21] Appl. No.: 641,220

[22] Filed: Jan. 15, 1991

[51] Int. Cl.$^5$ .................. B65H 81/00; B64C 11/12
[52] U.S. Cl. .................. 156/174; 156/169; 156/173; 156/245; 156/286; 416/134 A
[58] Field of Search .......... 416/134 A, 230, 141; 156/174, 169, 173, 175, 245, 286, 425, 426; 264/258

[56] References Cited

U.S. PATENT DOCUMENTS

| | | |
|---|---|---|
| 3,669,566 | 6/1972 | Bourgaurdez et al. ......... 416/134 A |
| 3,711,350 | 1/1973 | Witzel, III ................... 156/296 |
| 3,762,834 | 10/1973 | Bourguardez et al. ........ 416/134 A |
| 4,381,902 | 5/1983 | Head et al. ................... 416/134 A |
| 4,427,340 | 1/1984 | Metzger et al. .............. 416/134 A |
| 4,591,400 | 5/1986 | Fradenburgh et al. .......... 156/80 |
| 4,676,720 | 6/1987 | Niwa et al. .................. 416/134 A |
| 4,707,688 | 10/1987 | Mussi et al. .................. 156/242 |
| 4,746,272 | 5/1988 | Noehren et al. .............. 416/134 A |
| 4,892,461 | 1/1990 | Matsumoto et al. ........... 416/134 A |
| 4,898,515 | 2/1990 | Beno et al. .................. 416/134 A |

FOREIGN PATENT DOCUMENTS 155444 9/1985 European Pat. Off. .

*Primary Examiner*—Michael W. Ball
*Assistant Examiner*—Daniel J. Stemmer
*Attorney, Agent, or Firm*—Vernon F. Hauschild

[57] ABSTRACT

The method of manufacturing a multi-legged (preferably five) flexbeam for a hingeless flexbeam helicopter rotor, which flexbeam is of one-piece construction and made solely of composite materials, and includes full length plies of unidirectional high strength fibers extending from a first leg and splitting in passing through the hub portion of the flexbeam, and then extending into two substantially diametrically opposite legs, and having cross and unidirectional plies interspersed between the full length plies to effect the desired taper and shape of the flexbeam hub and legs, and wherein the final ply lay-up is made on a rotatable lay-up tool of dodecahedron shape.

17 Claims, 6 Drawing Sheets

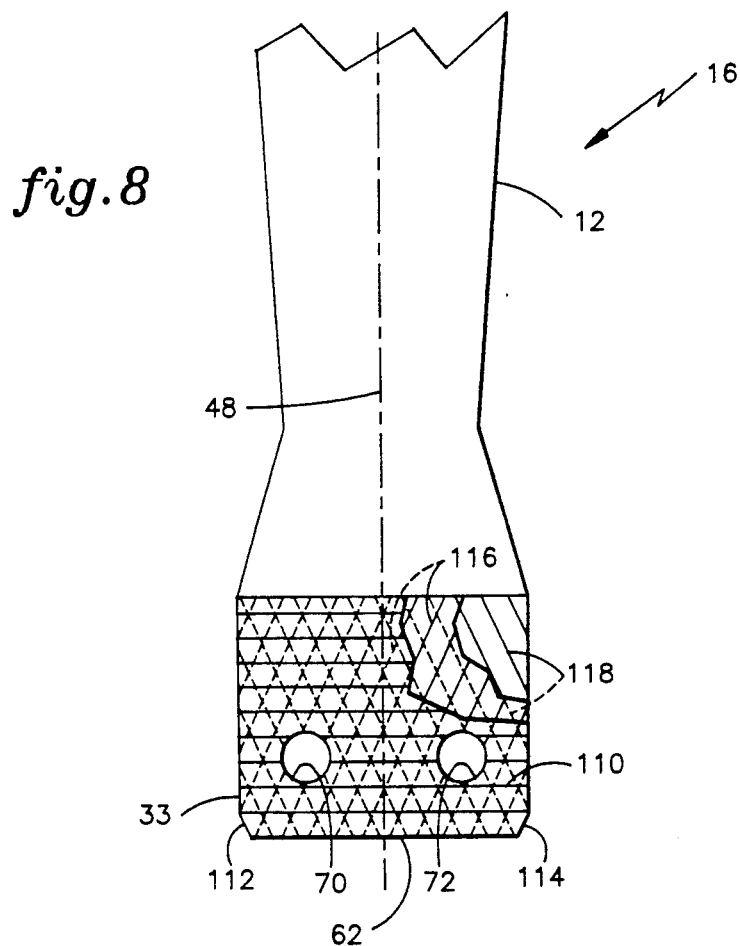
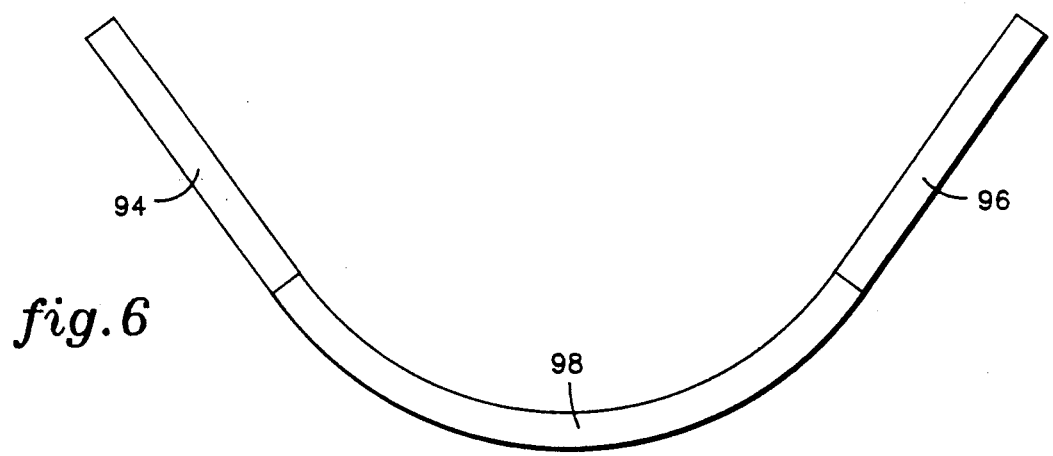

METHOD OF MANUFACTURING A UNITARY, MULTI-LEGGED HELICOPTER ROTOR FLEXBEAM MADE SOLELY OF COMPOSITE MATERIALS

This application contains similar material to an application filed on even date herewith identified as U.S. patent application Ser. No. 07/641,237, entitled "A Unitary, Multi-Legged Helicopter Rotor Flexbeam Made Solely of Composite Materials and the Method of Manufacturing Same" and invented by L. Dcolin et al.

TECHNICAL FIELD

This invention relates to the method of manufacturing a multi-legged flexbeam for a hingeless flexbeam helicopter rotor, which flexbeam is of one-piece construction and made solely of composite materials, and includes full length plies of unidirectional high strength fibers extending from a first leg and splitting in passing through the hub portion of the flexbeam, and then extending into two substantially diametrically opposed legs, and having cross and unidirectional plies interspersed between the full length plies to effect the desired taper and shape of the flexbeam hub and legs.

BACKGROUND OF THE INVENTION

In the flexbeam helicopter rotor art, helicopter rotors have traditionally been made so that the flexbeam extends from one blade through the hub and into a diametrically opposed blade, such as shown in European Patent No. 155,444 dated Sept. 25, 1985, or of the four-bladed cross-beam variety in which two diametrically opposite blades are joined by a first flexbeam which forms at least a portion cf the hub when it crosses a second flexbeam which is perpendicular to the first flexbeam and supports the other two diametrically opposed blades, such as in U.S. Pat. No. 4,746,272 to Noehren et al, dated May 24, 1988, which is quite suitable for a four bladed rotor.

U.S. Pat. No. 4,898,515 to Beno ard Noehren, granted Feb. 6, 1990, is similarly directed to a four-bladed cross beam helicopter rotor with particular emphasis on the external composite wrap. U.S. Pat. No. 4,892,461, dated Jan. 9, 1990, issued to Matsumoto et al is also directed to a flexbeam for a helicopter rotor, and a filament winding and curing process is used as shown in FIGS. 6 and 7 thereof, to form frame members 10, which are molded to opposite sides of a central member 9 and coact therewith to form what appears to be a two-bladed flex rotor, or one of the flexbeams used in a crossbeam rotor of the type disclosed in the aforementioned Beno and Noehren patent. U.S. Pat. No. 4,381,902, issued May 3, 1983 to Head and Banerjee also teaches a crossbeam rotor of the type disclosed in the above-recited prior art, but its principal teaching is directed to the use of elastomeric pads 10 interposed between the flexbeam and the hub.

However, this invention is directed to the fabrication of such a flexbeam for use with a helicopter rotor having at least three blades and preferably five blades, known as the assignee's PENTAFLEX TM rotor, the legs of which extend radially from the flexbeam hub and the rotor axis of rotation and the axis of a central aperture in the flexbeam, and which are equally spaced circumferentially about that axis.

The flexbeam prior art with its diametrically opposed blades offers no solution as to how to fabricate a unitary five-legged flexbeam made solely of composite material and fabricated so that it is capable of withstanding all rotor centrifugal, torsional, in-plane and flapping loads, and is also capable of accommodating the required pitch change, lead-lag and flapping blade motions.

DISCLOSURE OF THE INVENTION

Therefore, it is an object of this invention to teach a method of manufacturing such a multi-legged flexbeam, preferably including five legs which extend radially from a central axis and are positioned equi-angularly circumferentially thereabouts so as to be usable with a five-bladed rotor and thereby achieve the reduced vibration and reduced acoustic signature advantages thereof, and which is fabricated solely of composite material so as to achieve the light weight, ballistic tolerance, ease of manufacture and reduced cost advantages thereof.

It is a further object of this invention to teach a method of manufacturing such a flexbeam in which each leg is of simple rectangular cross-section with its major dimension located in a plane perpendicular to the central axis, and which has areas of maximum thickness, and therefore maximum strength, at both the leg radial inner end which joins to the hub, and at the leg radial outer end so as to be able to receive and react loads imposed by connecting bolts passing therethrough. The flexbeam includes an area of minimal cross-sectional area between the increased cross-sectional station at each leg radial inner and outer end so that the flexbeam can react lead-lag and flapping motions of the blade which it will support.

It is a further object of this invention to teach a method of manufacturing such a flexbeam which consists of at least one full length ply of unidirectional high tensile strength fibers extending for the full width and from the outer periphery of each leg and extending radially inwardly therefrom and splitting as it passes through the flexbeam hub section to form a Y-shape with one of the legs of the Y so split extending for the full length and half the width of one substantially diametrically opposed leg, while the other leg of the Y so split extends for the full length and half the width of a second substantially diametrically opposed leg such that centrifugal loads encountered in each leg will be passed by the full length ply of unidirectional fibers into two substantially diametrically opposite legs.

It is a further object of this invention to teach a method of fabricating such a flexbeam in which there are a plurality of such full length plies of unidirectional fibers used in the fabrication of the flexbeam, and in which there are a plurality of taper plies extending from the hub radially outwardly in each blade, and other such taper plies extending from the radially outer end of each leg radially inwardly so as to define the desired taper of each leg and hub of the flexbeam and so as to cooperate with the full length plies to establish the maximum cross-sectional areas of the flexbeam at the hub, and at the inner and outer ends of the leg.

It is still a further object of this invention to teach a method of fabricating such a flexbeam in which at least some of the aforementioned taper plies are cross-ply to the unidirectional plies, and in which other of the taper plies are laid up of unidirectional material in the same fashion as the full length plies but terminating at selected stations along the flexbeam leg lengths to cooperate with the cross-ply taper plies and the full length unidirectional plies in establishing the desired flexbeam contour.

It is still a further object of this invention to teach a method of fabricating such a multi-legged flexbeam in which the taper plies are of selected length and terminate at selected stations in relation to the other taper plies so as to avoid the creation of resin pockets in the flexbeam.

It is still a further object of this invention to teach a method of fabricating such a multi-legged flexbeam, which is fabricated solely of composite materials so as to achieve the advantages of ballistic survivability and the benign failure mode detectable by visual inspection offered by composite materials.

It is a further object of this invention to teach the method of manufacturing such a multi-legged flexbeam in which filler plies are placed between the interstices of the full length plies so that each ply progresses smoothly and without indentures or kinks in passing through the hub area during composite material lay-up and in operation of the flexbeam.

It is a further object of this invention to teach a method of manufacturing such a multi-legged flexbeam that has ballistic survivability in that if certain fibers were ruptured due to ballistic penetration, there are many other fibers which would coact to carry the load, and therefore there would not be a catastrophic failure as could be the case if the flexbeam were made of metal.

It is still a further object of this invention to teach the method of manufacturing such a multi-legged flexbeam in which the full length plies and the short length taper plies are made of unidirectional fiberglass, the other taper plies are made of unidirectional graphite but are shaped and positioned so that when cooperating with the full length plies and the unidirectional short length taper plies, the graphite fibers will be positioned at a substantial angle with respect to the unidirectional plies, for example, +45° and −45°.

It is still a further object of this invention to teach the method of fabricating such a helicopter rotor flexbeam in which filler plies are made of unidirectional graphite or fiberglass and are shaped and positioned to fit between the interstices formed by the full length plies at their bifurcation at the hub.

It is a further object of this invention to teach the method of fabricating such a helicopter rotor flexbeam in which the full length fibers are laid up on a rotatable lay-up tool of dodecahedron shape having twelve pentagon shaped facets in which the axis of rotation passes through two of the facets which will not be used for lay-up, and in which lay-up will occur on the remaining ten facets by the action of a filament winding machine programmed to selectively lay up at least one ply of the full length plies or each of the ten facets of the lay-up tool.

It is a further object of this invention to teach such a method of manufacturing a helicopter rotor flexbeam which is capable of producing such parts in production quantities.

It is still a further object of this invention to teach a method of manufacturing such a helicopter rotor flexbeam in which the taper plies are prefabricated and preplied and selectively laid up on the full length plies while on the dodecahedron lay-up tool.

It is still a further of object of this invention to teach the method of fabricating such a helicopter rotor flexbeam in which the filament winding machine is programmed to lay-up a single band of unidirectional fiberglass extending for the full length of one of the legs of the flexbeam and into one of the diametrically opposite legs of the flexbeam in selected sequence on each facet of the lay-up tool, then laying up a second such unidirectional fiberglass band adjacent the first band on each facet of the lay-up tool, then the third band, and so on, until the lay-up pattern is completed and consists of a unidirectional ply of fiberglass extending for the full length of each leg of the flexbeam, bifurcating at the hub thereof, and extending radially outwardly for the full length and half the width of two diametrically opposed flexbeam legs and in which the bands interweave in passing through the hub of the flexbeam, and in which the pattern passes in close proximity, but not through the centerline of the flexbeam so as to leave an aperture in the center thereof.

Other objects, features and advantages of the invention will become apparent in light of the following description thereof.

BRIEF DESCRIPTION OF THE DRAWINGS

FIG. 6 is a showing of the lay-up of the plies, as taken from the mandrel shown in FIG. 5 to fabricate the short length unidirectional plies shown in FIG. 4.

FIG. 8 is a showing of the radial outer end of one of the legs of the flexbeam showing the high tensile strength hoop wrap, and the helically wound layer of the high tensile strength material wrapped around the leg outer end.

BEST MODE FOR CARRYING OUT THE INVENTION

Figure 1:
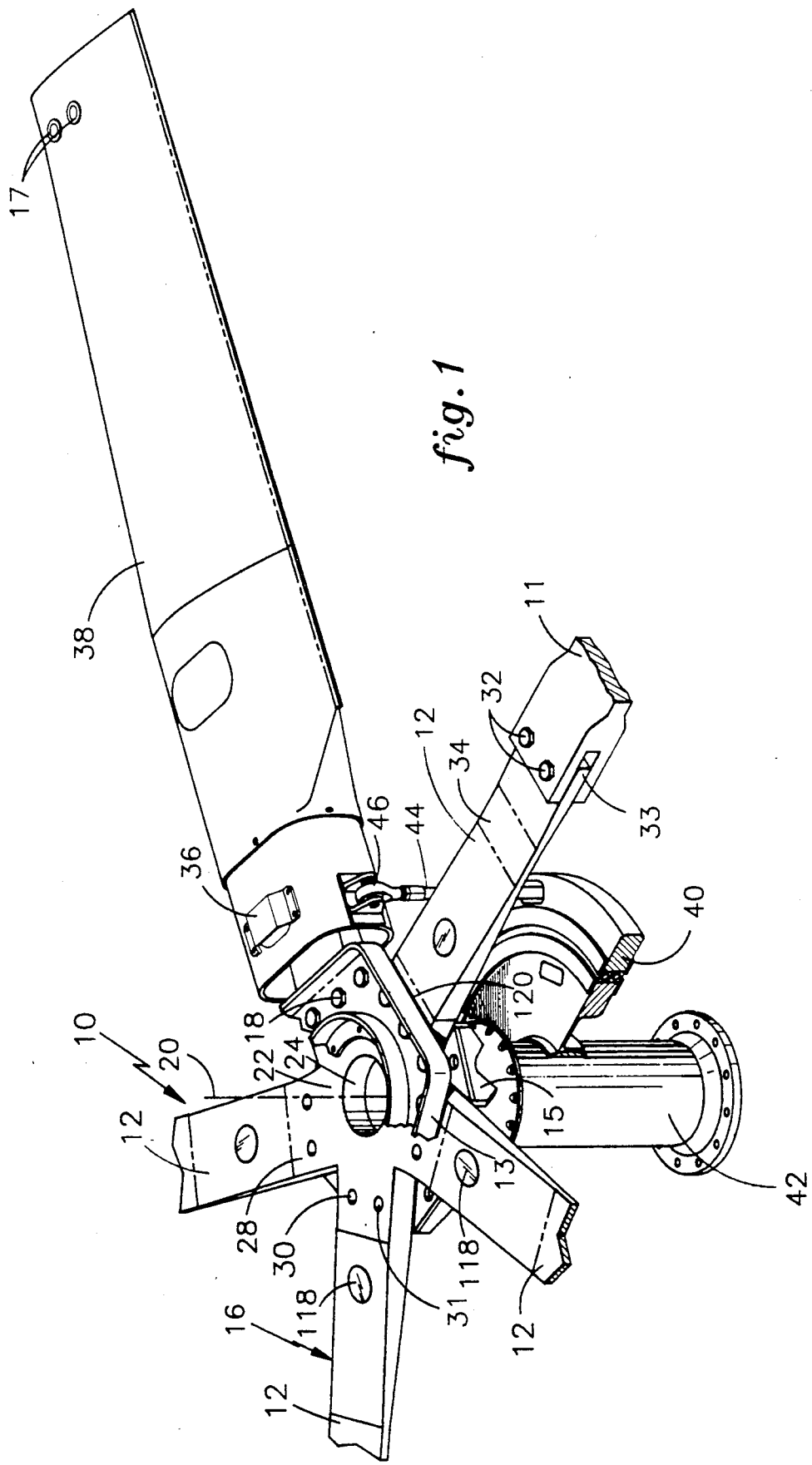
FIG. 1 is a perspective view, partially broken away, of the rotor of a five-bladed helicopter utilizing the five-legged flexbeam of this invention.

Viewing FIG. 1 one sees the assignors' five-bladed PENTAFLEX TM helicopter rotor 10 which consists of five blades 11 which are connected to rotor 10 through five-legged flexbeam 16. Flexbeam 16 is connected to the remainder of the rotor by connecting bolts 18 so as to rotate therewith about its axis and axis of rotation 20. Flexbeam 16 consists of a central hub 22, which is of generally circular shape and concentric about axis 20, and has central aperture 24 therewithin and five legs 12 which are integral with hub 22, and extend radially therefrom and are equally spaced circumferentially thereabout. The legs 12 are fabricated to be of their greatest thickness at their inner ends 28, where they receive connecting bolts 18, and at their outer ends 33, where they are connected to blade 11 through connecting bolts 32. Each of the legs 12 of flexbeam 16 tapers in a radially outward direction from its inner end 28 and tapers in a radially inward direction from its outer end 33. These tapers stop short of and defines the periphery of minimal cross-sectional area 34.

Snubber mechanism 36 positions torque tube 38 with respect to flexbeam 16. Torque tube 38 is connected to blade 11 by conventional connecting means 17.

A conventional swashplate 40 is positioned around rotor drive shaft mast 42 and is both movable therealong and tiltable with respect thereto by conventional controls to cause pitch change rod 44, one of which is connected to each blade torque tube 38 at connecting point 46, to rotate so as to cause blade pitch change in either the collective or cyclic mode.

In operation, as rotor 10 is driven through a drive shaft (not shown) within mast 42 by a conventional drive system (not shown).

Blades 11 will move in flapping motion, in-plane motion, as well as in pitch change motor. Flexbeam 16 must react all of these motions and it should be noted that the blade flapping motion can be as much as $+10°$, its lead-lag motion can be as much as $+6°$, and its range of pitch change motion can be as much as $60°$. In addition, all loads generated by or in blades 12 must be reacted by flexbeam 16 in imparting those loads to rotor 10. These loads include blade centrifugal loads which are in the order of 50,000 pounds, the blade flapping loads brought about by the blade flapping motion, the blade in-plane or lead-lag loads brought about by that motion, and the blade torsional loads.

It will therefore be seen that beam 16 must be able to withstand and transfer these various loads from the blade to the hub and accommodate these various motions of the blade, such that very substantial load carrying and motion accommodating requirements are imposed upon flexbeam 16.

To manufacture a flexbeam which is capable of withstanding these load and motion demands, yet meet the aircraft use requirement of lightness of weight, ease of manufacture, ballistic tolerance and benign failure mode, flexbeam 16 will be made from high tensile strength fiber material, such as fiberglass and graphite, although other high tensile strength fibrous materials could have been used, such as carbon, aramid, oriented polyolefin, quartz, boron, silicon carbide, aluminium oxide, and drawn metals (such as metal wire) and metal fibers, cured in a resin matrix, such as epoxy, to form a flexbeam of composite material.

The important properties of fiberglass which make it desirable for such a use is its high tensile strength of about 250k psi, its high elongation (strain-to-failure ratio), and its low Young's Modulus ($11 \times 10^6$ psi). In view of these properties, fiberglass is capable of handling high tensile loads, such as the centrifugal loads of the helicopter blade, and is capable of substantial torsional and flexural action, but it is not very stiff. In the preferred method of operation, S-2 fiberglass is used. In S-2 fiberglass, approximately 256 filaments are used to make up an end, and either 12, 20 or 60 ends are used to make up a roving or strand, with b 20 ends being preferred. A number of strands or rovings is used to make up a columnmate or filter band of fiberglass. These strands or rovings are placed side by side to make up the fiber band.

In addition to fiberglass, certain of the composite parts used in my manufacture of the flexbeam will be made of graphite fiber in an epoxy matrix. In the fabrication of graphite, approximately 12,000 filaments make up a tow, and a number of tows or strands are then columnmated (placed side by side) into a fiber band. The properties of graphite fiber that make it desirable for our purpose are its high tensile strength of 250k psi, its stiffness-medium to high Young's Modulus, which can be between ten and 120 $10^6$ psi, but our preferred Modulus is 33 $10^6$ psi. It will therefore be seen that the graphite is roughly three times as stiff as the fiberglass and is used in areas which require this characteristic, such as, in areas where you do not want the flexbeam to flex, and in areas which must accept the penetration of bolt holes, such as the bolt holes 30 and 31 to accept bolts 18 at the flexbeam leg inner end, and 32 bolt holes 70 and 72 (see FIG. 9) to receive connecting bolts at the flexbeam outer end.

In view of the complexity of five-legged flexbeam 16, and the load carrying and motion accommodating demands to be made thereof, the part is a complicated part to make and will consist of the lay-up of several plies of composite material selected to perform specific functions.

Figure 2:
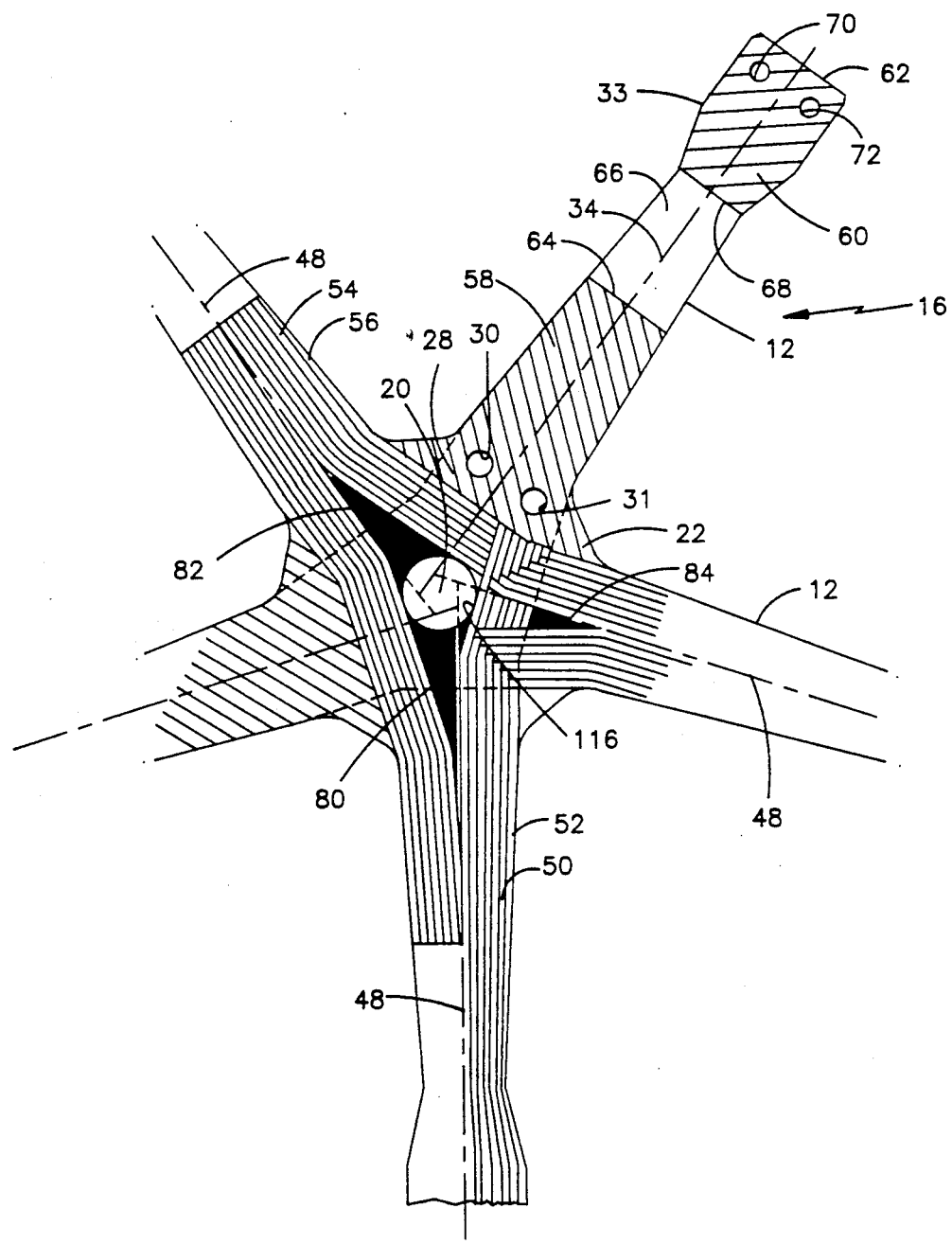
FIG. 2 is a partial view of the five-legged flexbeam, which is the subject matter of this invention, showing the various plies of composite material used in the fabrication thereof.

As best shown in FIG. 2, flexbeam 16, each of whose legs 12 are identical, and concentric about their axis 48, will consist of several different plies. Each leg will have a plurality of full length plies 50 which consist of a series of bands 52 of unidirectional fiberglass extending for the full length and width of each leg. Flexbeam 16 also includes short length taper plies 54, which consists of plies made up of a plurality of unidirectional fiberglass bands 56. Short length taper plies 54 extend for the full width and a portion of the length of each leg 12. Additional taper plies are shown in FIG. 2 at 58 and 60. These taper plies 58 and 60 are composite materials made of graphite whose fibers are selected to extent, some at $\pm 45°$ and some at $-45°$, to leg axis or centerline 48 and the unidirectional fibers of full length ply 50 and short length taper ply 54. Taper plies 58 extend radially outwardly from the full length ply where the full length ply passes through hub 22 and extends a selected distance radially outwardly on leg 12, and is shaped to be the width for leg 12.

Taper plies 60 extend from the outboard end 62 of legs inwardly and terminate short of taper ply 58. Short length unidirectional taper plies 54, and taper plies 58 and 60, are selectively cut to desired length so that when laid up in the fabrication of flexbeam 16, full length ply 50, short length taper ply 54, and taper ply 58 cooperate to form an outwardly directed taper in leg 12 extending from hub 22 where it is at its maximum thickness to station 64 in FIG. 2 so as to define the thickened portion 28 of leg 12 adjacent hub 22 and to cooperate with taper ply 54 to define the boundary of the area of the minimum cross-sectional area 66 of leg 12. Taper plies 60 are also cut of selected length and cooperate with full length plies 50 to form the thickened portion 30 of leg 12 at the radially outer end thereof so that the leg 12 tapers inwardly progressively to the station where taper plies 60 terminate at station 68 to form the other boundary of minimum cross-sectional area 34 of leg 12. Taper plies 58 and 60 are fabricated of graphite to provide flexbeam legs 12 with stiffness at the area of their location, and also to accept bolt holes 70 and 72 at the outer end thereof to receive connecting bolts 32 and to receive bolt holes 74 and 76 at the inner end thereof to receive bolts 18.

Filler plies, such as 80, 82 and 84, are fabricated as a composite including unidirectional graphite or fiberglass and are shaped to fill the interstices at the bifurcation of full length plies 50 in passing through hub 22 so that successively laid up full length plies 50 will extend in flat fashion in passing through hub 22, thereby avoiding stress creating kinks in the fibers. It will therefore be seen that flexbeam 16 includes full length plies 50 of unidirectional fiberglass, short length taper plies 54 of unidirectional fiberglass laid out in the same pattern as the full length plies 50, graphite taper plies 58 and 60, and filler plies, such as 80, all contained in a resin matrix, such as epoxy, to form a composite material therewith.

Figure 3:
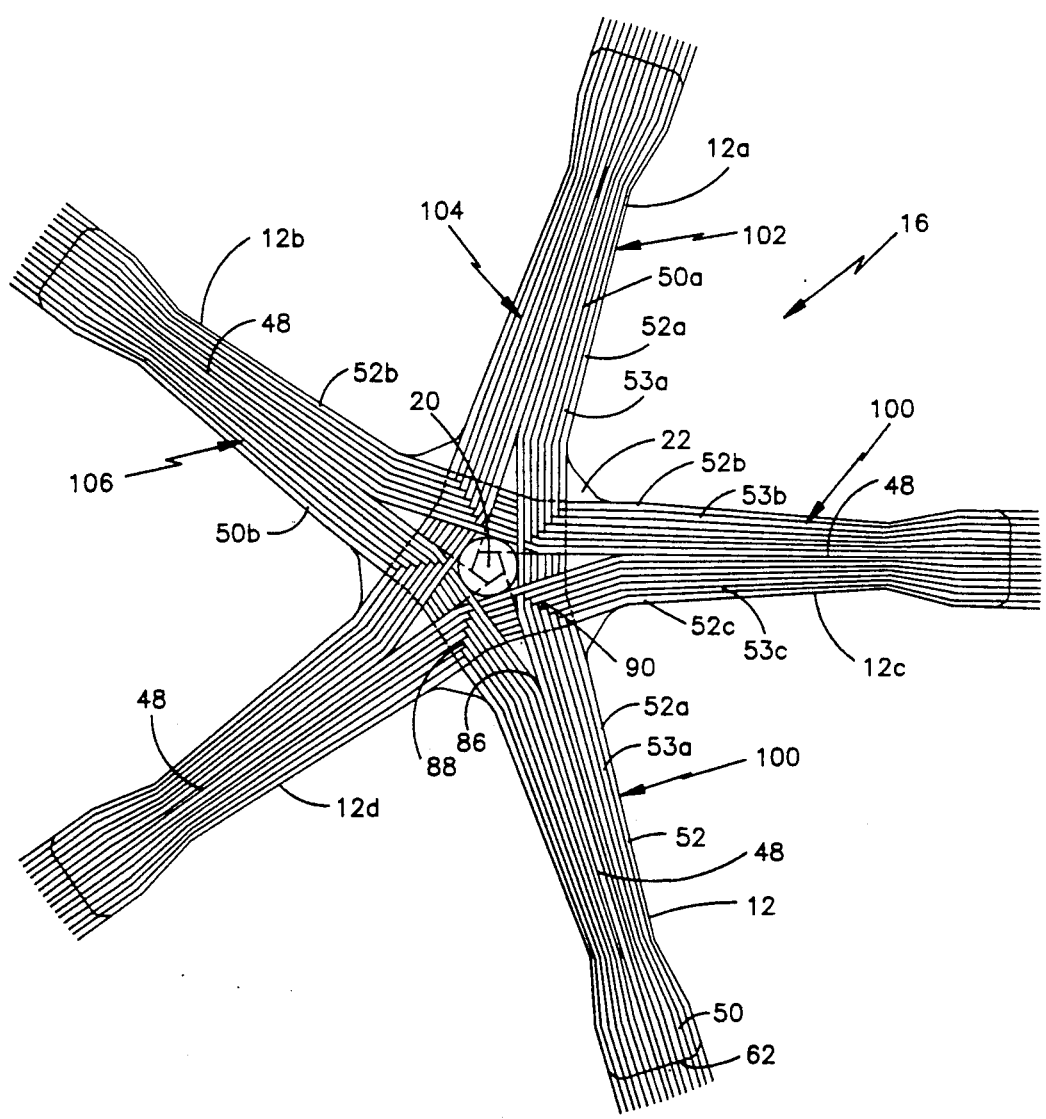
FIG. 3 is a partial showing of the five-legged flexbeam, which is the subject matter of this invention, showing the unidirectional full length plies, which are the principal composite material used in the fabrication of the flexbeam.

Viewing FIG. 3, it will be seen that full length unidirectional fiberglass ply 50 extends from the radially outer end 62 of leg 1 radially inwardly occupying the full width of the leg 12 and is symmetric on opposite sides of centerline or axis 48 thereof, and bifurcates at station 86 to form two legs, one of which 50*a* extends into and for the full radial length and one half the width of a substantially diametrically opposite first leg 12*a*, while the other half thereof 50*b* extends into and for the full radial length and for one half the width of a second substantially diametrically opposite leg 12*b*. In this fashion, it will be noted that any radial type of load, such as the blade centrifugal load, which is imparted to leg 12 will be transmitted through high tensile strength fibers in ply 50 into corresponding plies 50*a* and 50*b* in the two diametrically opposite legs 12*a* and 12*b*. Each of the flexbeam legs 12 is fabricated precisely as is the one fully illustrated in FIG. 4. The full length plies 50, between which the taper plies are interspersed, serve to hold the entire flexbeam together.

It is important to note, as shown in FIG. 3, that the method of lay-up ply 50 produces an interleaved or interwoven pattern between the full length plies 50 of each leg 12 as shown, for example, at 88 and 90. The benefit of this is that all of the material in the full length plies 50, 50*a*, 50*b*, etc. is interlocked in the hub 22 to form one very large ply. This interweaving provides an addition load transfer path into adjacent legs 12 other than interlaminer resin shear. It also ties the preplied material (plies 54, 58, 60, 80, 82 and 84 laid-up in the hub and each of the legs) together to form one integral large preply.

Figure 4:
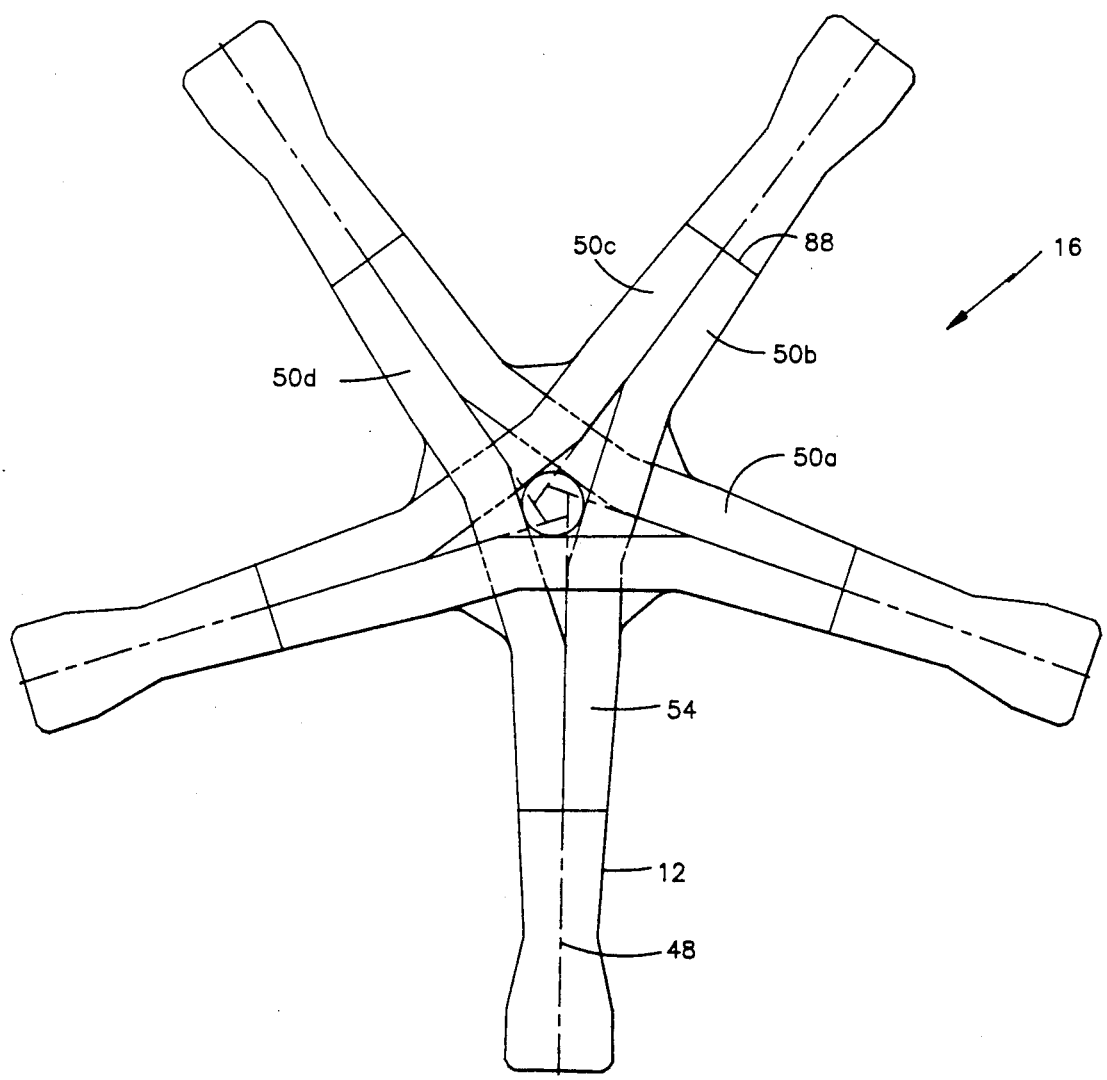
FIG. 4 is a partial showing of a five-legged flexbeam showing the position of the short length unidirectional taper plies used in the fabrication of FIG. 5 is a showing of the mandrel and the filament winding machine used in producing the short length taper plies shown in FIG. 5.

Now viewing FIG. 4, it will be seen that the short length taper plies of unidirectional fibers 54 form the same pattern, although not interwoven, as the full length plies 50 shown in FIG. 3. These plies are also fabricated from unidirectional fiberglass. Just as the full length plies 50, plies 54 extend for the full width of the leg 12 into which they project, bifurcate and then, at one half width, extend into two substantially diametrically opposite legs. By laying up five dog-leg plies of unidirectional fiber, namely, legs 50*a*, 50*b*, 50*c*, 50*d* and 50*e*, in that order, a single ply of unidirectional fiberglass is produced which extends for the full width of each leg 12 of flexbeam 16 and for a selected portion of the length thereof to cooperate with the full length plies 50 and the taper plies 58 when laid up to form the tapered inboard end of each leg 12.

Figure 5:
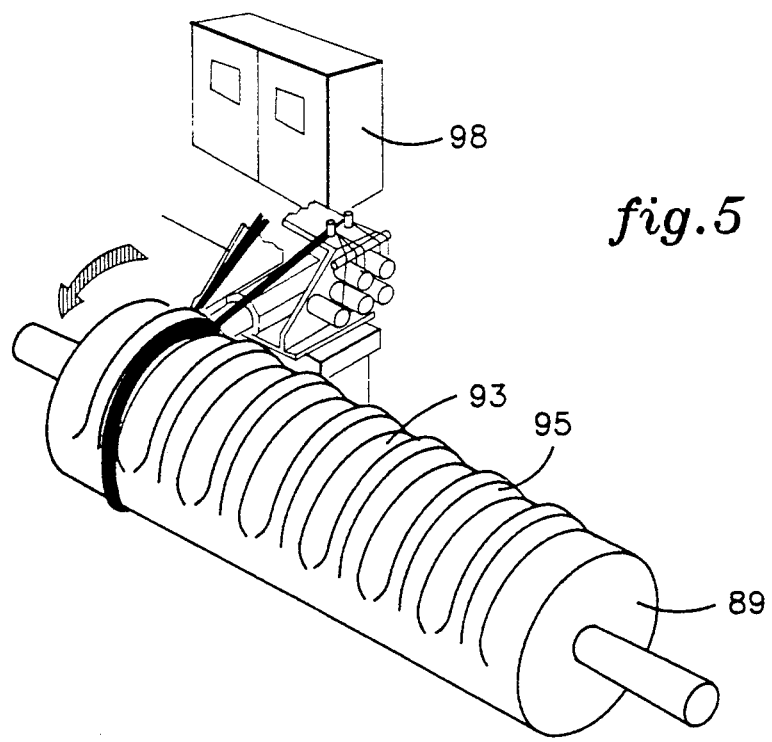

While no particular order of fabricating the various plies is necessary in the utilization of this invention, the method of fabricating the short length plies 54 is described first. Viewing FIG. 5, one sees rotatable mandrel 89, which has cylindrical portions such as 93, and conical portions such as 95 thereon. The filament winding machine illustrated at 98 acts to produce at least one layer of unidirectional fiberglass along each of the cylindrical sections 93 and the conical sections 95 after the mandrel is prepared with a covering of circumferentially laid-up strips of plastic film. These strips of film serve both as a release material to cover the mandrel and as carrier film for the filament wound preplies 54.

The fiberglass so wound onto surfaces 93 and 95 is then slit from the mandrel along with their carrier film and laid up on pallets for compaction. The compacted plies 94, 96 and 98 are then laid out as shown in FIG. 6 such that the straight portions 94 and 96, which were laid up on cylindrical portion 93 of the mandrel, are laid at opposite ends of the arcuate portion 98, which was laid on the conical sections 90 of mandrel 89. This will produce a dog-leg shaped ply of unidirectional fiberglass. The plies are formed as shown in FIG. 6 are clicker die cut to the desired shape shown in FIG. 2 to form short length unidirectional taper plies 54.

The graphite taper plies 58 and 60 are then cut on an NC cutting table to the desired shape shown in FIG. 2, and plies 54, 58 and 60 are selectively cut to length so that when laid up together with all other plies, they will cooperate therewith to produce the desired tapered shape of flexbeam 16. Taper plies 54, 58 and 60 are perfectly preplied and compacted so that they will be of desired shape to coact with full length plies 50 to form the eventual shape of flexbeam 16. Taper plies 54, 58 and 60 could also be individually laid up with full length plies 50, but the preply method is preferred.

Figure 7:
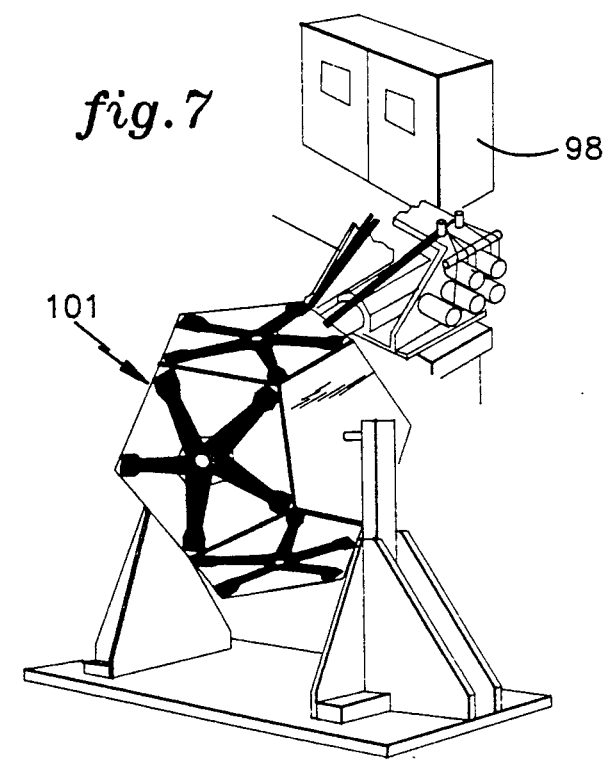
FIG. 7 is a showing of the dodecahedron lay-up tool used in the lay-up of the composite materials during the fabrication of this five-legged flexbeam.

We are now ready to commence lay-up of the preplies which will include full length plies 50, short length taper plies 54, taper plies 58 and 60, and filler plies, such as 80. This operation takes place on a the lay-up tool 101, shown in FIG. 8. Lay-up tool 101 is shaped as a dodecahedron, that is, a twelve-sided figure having twelve equally shaped and sized pentagon facets. The dodecahedron shape was chosen because it permits the lay up of at least ten plies or preplies at a time, and the tool can be positioned selectively to afford ready access to its facets to permit machine or hand lay-up thereon. Two of those facets will not be used in this operation and the lay-up tool will be mounted so as to rotate about an axis of rotation extending through the two unused facets. The filament winding machine 98 illustrated in FIG. 7 is computer programmed to position the lay-up tool 101 to the desired position to permit the filament winding machine to produce a full length unidirectional ply pattern 50 on each of the remaining ten surfaces or facets thereof. Prior to lay-up, lay-up tool 101 will be prepared by covering its active cavity surfaces with a release film material. This film material serves both as a release material for the tool and as a carrier film for the large compacted preplies.

The manner of operation of the lay-up tool and the filament winding machine shown in FIG. 7 will best be understood by again viewing FIG. 3. The filament winding machine is computer programmed to first lay up a unidirectional band of fiberglass 52*a* on leg 12 of flexbeam 16, and continue that band 52*a* through hub 22 and into and radially outwardly for the full length of leg 12*a*. A band corresponding to 52*a* will then be sequentially laid up on all other facets of lay-up tool 52*a*, which we will identify as 52*b*, which starts at the outboard end and comes radially inwardly for the full length of leg 12*c*, then passes through hub 22 and extends for the full radial length of leg 12*b*. A band corresponding to 52*b* will then be sequentially laid up on all other facets of lay-up tool 101. Then a corresponding band 52*c* is formed in leg 12*c* and extends through hub 22 into leg 12*d*. A band corresponding to 52*c* will then be sequentially laid up on all other facets of lay-up tool 101. Then a second band 53a is laid up for the full length of leg 12 and into leg 12a, sequentially on all facets of tool 101, followed in sequence by corresponding bands 53b in leg 12c into leg 12b, and 53c extending the full length and from leg 12c through hub 22 and into leg 12d, sequentially on all facets of tool 101. Adjacent plies are laid up corresponding to plies 52 and 53 until the leg centerline or axis 48 is reached. The same procedure is followed for the other half of all legs such that the laying up of five plies identified in FIG. 3 as 100, 102, 104 and 106 results in a complete single ply 50 of full length unidirectional fiberglass extending for the full width of each leg 12, 12a, 12b, 12c and 12d, and each bifurcating at a station, such as 86, before passing through hub section 22, and then extending in half width form into two diametrically opposite legs, such as legs 12a and 12b from leg 12. It will be noted by viewing FIG. 3 that by so laying up all of these layers, an interwoven pattern, such as 86 and 90, is formed at hub 22 between the layers as they cross over to provide the advantage described earlier. When this first pattern is finished on each of the ten facets of dodecahedron shaped lay-up tool 101, the pattern in each leg on each facet will be as shown in leg 12 of FIG. 3.

With the full length unidirectional fiberglass plies 50 so laid up on each of the ten facets of tool 101, additional such full length plies may be laid up if desired.

Filler plies 80 through 84 will then be laid up in place as shown in FIG. 2. The next step is to lay up the short length and unidirectional taper plies 54 and the graphite taper plies 58 and 60 on each of the unidirectional full length plies 50 so laid up on each of the ten facets of tool 101. These taper plies may be laid up individually on the full length ply 50 at this time, or may be selectively laid up as a preply and debulked, and then laid up on the full length unidirectional ply 50. The number of taper plies 54 and 58 is selected to coact with the various full length plies 50 on each of the facets of tool 98 so that when all ten of these preplies are laid up in a mold for curing, they form the shape of flexbeam 16 with taper plies 54 and 58 cooperating with full length plies 50 to form the thicker inboard portion 28 of each leg and create outwardly tapering section 31 shown in FIG. 2, while taper plies 60 coact with full length plies 50 to form the thickened out end 30 of each leg 12 of the flexbeam 16 and tapered section 26 projecting radially inwardly therefrom. Tapered sections 31 and 26 stop in spaced relationship along leg centerline 48 to define minimum cross-sectional area 34 positioned therebetween.

With the preply including the full length taper ply 50, the short length taper ply 54, and the graphite taper plies 58 and 60 so laid up on each of the ten facets of lay-up tool 101, the lay-up tool is covered with a vacuum bag and all preplies so laid up on the ten facets are debulked or compacted.

These ten compacted or debulked preplies are then cut to size and removed from the ten facets of the lay-up tool 101. At this point, these ten preply lay-ups from the ten facets of the lay-up tool can be stored in a cold environment to prevent the commencing of curing thereof and laid up at a convenient time. In the alternative, the final lay-up can commence. The preplies are then laid up in the female cavity section of a matched male/female mold and the part is then press cured by placing the matched mold with the ten compacted preplies therein in a heated platen press to thereby cure the ten laid-up preplies so as to form the flexbeam 16 as a unitary, five-legged composite part with inboard hub.

The cured flexbeam 16 is then demolded and deflashed, preferably at an automated vapor blast station so as to remove all excess resin residue. The vapor blast operation also prepares the part surface for subsequent bonding operations, as well as providing a good coupling surface for ultrasonic inspection. Flexbeam 16 so laid up and cured, demolded and deflashed, is then visually and dimensionally inspected, followed by a nondestructive (ultrasonic) inspection at a manual or preferably automated computer controlled inspection station. After inspection, the part is cleaned and oven dried.

While my preferred method of operation is to use prepreg, that is, previously resin impregnated plies for each of the plies 50, 54, 58, 60 and 80, there is an alternative method of operation. These various plies could have been laid up dry with sufficient bonding material therebetween to hold the plies in place for handling purposes and then, once the preplies are removed from lay-up tool 101 and placed in the matched male-female die, an appropriate resin, such as epoxy, may be injected thereinto for dispersal therethroughout before the curing process commences.

For the purpose of improving the ballistic survivability of the thickened outer end 33 of each leg of fiberglass roving is wound over the outboard section 33 of each arm 12 as illustrated in FIG. 8 as hoop wrap 110. In addition, this wrap is followed by a filament wound helical wrap of approximately 65° helix angle to improve the machinability of the same thickened outer end of each leg 12 of flexbeam 16, as illustrated in dotted lines in FIG. 8 and designated as 116 and 118. This helical wrap supports the outer end 30 for the machining operation necessary to produce bolt holes 70 and 72, which must be drilled therethrough to receive the bolts 30, which will attach the flexbeam 16 to blade 11. A specialized flywinding machine (not shown) may be used to overwrap the ends 30 of flexbeam legs 12. The fiberglass used in this overwrap is laid up wet to maintain the wound-in fiber tension and then cured in a set of self-contained, integrally heated matched steel molds.

The purpose of the hoop wrap is for ballistic survivability, and the purpose of the helical wrap is to protect the hoop wrap when the outer section is penetrated due to the fabrication of the connecting bolt holes and to prevent delamination of the fibers which have been laid up and positioned thereunder, since these plies must experience high strain during rotor operation.

The full length plies 50, between which the taper plies are interspersed, serve to hold the entire flexbeam together.

After the overwrap has been so cured, the flexbeam 16 is profile machined and chambered at 112 and 114 (see FIG. 8) at the ends of each leg 12.

With flexbeam 16 at this point of completion, and properly fixtured, bolt holes 70, 72, 30 and 31 are drilled at the outer and inner ends of each leg 12, as shown in FIG. 2, and center hole 116 is drilled at the same time. Holes 70, 72, 30 and 31 are preferably drilled slightly oversized then bushings are liquid shimmed precisely in place in these holes. This use of shimming liquid permits slight movement of the bushings within the slightly oversized holes so that the bushings are in precisely the proper position as determined by the fixture by the time that the shimming liquid cures to a solid.

At this point, snubber pads 118 are bonded to legs 12 to prevent damage to the flexbeam arms legs 12 by the action of snubbers 36. At the same time, fretting shims 120 are positioned between the flexbeam 16 and the upper and lower rotor connecting plates 13 and 15 (see FIG. 1) to prevent fretting between the flexbeam 16 and the rotor connecting plates 13 and 15.

The final procedure is for the entire assembly to be inspected, balanced and painted, if desired.

We claim:

1. The method of manufacturing a helicopter rotor flexbeam made solely of composite materials and including a flexbeam hub of generally circular shape and concentric about an axis, at least three flexbeam legs each having a centerline and extending radially outwardly from the hub and integrally attached thereto and spaced equidistant circumferentially about the hub, and each leg having a length and width comprising a plurality of full length plies of composite material which form a pattern extending for the full leg width and the full leg length and bifurcating in passing through the hub forming bifurcated portions such that the bifurcated portions extend into and for the length of two diametrically opposite legs, and taper plies of composite material including short length taper plies of composite material forming the same pattern as the full length plies, and other taper plies being made of composite material, which taper plies are selectively shaped and positioned between the full length plies to cooperate therewith to define a shape of the hub and of each leg so that each leg has an inboard section tapering outwardly from the hub and an outboard section tapering inwardly to form thickened sections at each end of the leg and a narrow section therebetween, and filler plies shaped to fit between interstices generated by the full length plies including the steps of:

a. producing the short length taper plies by a method comprising:

(1) providing a rotatable mandrel having cylindrically shaped sections and conically shaped sections;

(2) filament winding high tensile strength fiberglass fibers on to both the cylindrical and conical sections of the mandrel such that adjacent fibers abut to form cylindrical and conical filament wound layers of at least one ply thickness;

(3) cutting the filament wound layers from the mandrel and producing a plurality of selectively shaped plies by laying them out flat, each with a substantially rectangular shaped ply with unidirectional fibers which was formed on the cylindrical section of the mandrel positioned at opposite ends of an arcuate ply which was formed on the conical section of the mandrel, to produce a plurality of plies which are arcuate in a central portion and have straight leg portions on opposite sides thereof with unidirectional fibers extending for the full length of each ply, and which is at least one ply thick; p2 (4) cutting the plies so laid out to a shape desired for the short length taper plies so that one straight leg portion will be sized to occupy one half the width of a flexbeam leg and extend for a portion of the length thereof, and the other straight leg portion will occupy one half the width and extend for a portion of the length of a substantially diametrically opposite leg of the flexbeam, and so that the unidirectional fiberglass fibers extend for the full length of the short length taper plies;

b. cutting other taper plies of composite material of selected shape to cooperate with the full length plies and the short length taper plies when laid up to form the thickened and tapered inboard section and the thickened and tapered outboard section of each flexbeam leg, the other taper plies having high tensile strength graphite fibers extending therethrough in parallel relationship to each other, but oriented to form a substantially angle with the unidirectional plies of the short length taper plies when laid up;

c. selectively laying up a plurality of short length taper plies and graphite taper plies to form a first preply which will cooperate with the full length plies and other first preplies to form a thickened radial inboard end of each flexbeam leg and the tapering section projecting radially outwardly therefrom, and a second preply which will cooperate with the full length plies and other second preplies to form a thickened radial outboard end of each flexbeam leg and the tapering section projecting radially inwardly therefrom;

d. affecting final lay-up of the composite materials to form the flexbeam by a method comprising:

(1) providing a rotatably mounted lay-up tool of dodecahedron shape having twelve pentagon shaped facets, and with an axis of rotation of the tool passing through two of the facets;

(2) providing a filament winding machine computer programmed to coact with the rotatable tool to lay up an identical selected pattern of composite material including unidirectional fiberglass fibers on a selected number of the tool facets, and which pattern results in at least one ply of composite material on each facet including unidirectionally directed fiberglass fibers extending substantially parallel to the centerline of each flexbeam leg and to the unidirectional fibers in the leg portions of the short length taper plies and extending for the full length and the full width of each flexbeam leg, and with the full length plies in each leg bifurcating in passing through the flexbeam hub and then extending into two substantially diametrically opposite legs to form one half the width of the ply in each of the two opposite legs, thereby producing identical ply patterns in a cross-sectional shape of the flexbeam and its full length plies on each of the selected facets of the lay-up tool;

(3) selectively laying up on the full length ply on each lay-up tool facet said first and second preplies so that the unidirectional fibers in the leg portions of each short length taper ply of each first preply is extending in a substantially parallel relationship along a portion of the length of each leg and for the full width thereof and so that the second preplies are positioned at the outboard end of the full length plies to form third preplies each comprising a full length ply, at least one short length taper ply, and at least one of the graphite taper plies at each of a radical inner and outer end of the flexbeam leg on each lay-up tool facet, which each third preply being selectively shaped to cooperate to form the flexbeam when all third preplies are laid up together;

(4) debulking the third preplies in unison while still on the lay-up tool;

(5) cutting each third preply to size and removing each from the lay-up tool;

(6) selectively laying up the third preplies to form a flexbeam lay-up in a mold shaped to define the flexbeam;

e. curing the flexbeam lay-up under appropriate heat and pressure;

f. demolding the flexbeam so cured;

g. overwrap winding over at least the outboard section of each leg of the flexbeam by:

(1) hoop wrapping high tensile strength fiberglass roving over at least the outboard section of each leg of the flexbeam to increase its ballistic tolerance, and (2) helically winding at substantially ±60° and substantially −65° fiberglass over the hoop wrapping for at least an outer portion of each flexbeam leg to prevent delamination of the plies;

h. drilling at least one hole in the inner and outer ends of each leg of the flexbeam and liquid shimming a bushing thereinto to receive a flexbeam-to-rotor connecting bolt and a helicopter blade retaining bolt.

2. The method of manufacturing a helicopter rotor flexbeam according to claim 1 wherein the legs of the short length taper plies and the other graphite taper plies are cut so that they will be of successively shorter length to affect the desired tapering at the inboard and outboard ends of the flexbeam legs.

3. The method of manufacturing a helicopter rotor flexbeam according to claim 2 wherein all plies are preimpregnated with resin.

4. The method of manufacturing a helicopter rotor flexbeam according to claim 3 wherein the resin is an epoxy.

5. The method of manufacturing a helicopter rotor flexbeam according to claim 1 wherein the full length plies, the short length taper plies, and the other taper plies, are laid up dry and epoxy is injected thereinto to coact therewith in forming a composite material prior to the curing process.

6. The method of manufacturing a helicopter rotor flexbeam according to claim 4 wherein the filament winding machine is computer programmed to lay up a first band of composite material on a first facet of the tool for the full length of a first leg of the flexbeam, then pass in proximity to the hub and then into a substantially diametrically opposite leg of the flexbeam for the full length thereof, then successively laying up such a first band of composite material on each facet corresponding to the first leg of the first facet until said first band is laid up on all facets of the tool, then so laying up such a second band, then so laying up such a third band until the full length unidirectional ply is fully laid up on each facet of the tool.

7. The method of manufacturing a helicopter rotor flexbeam according to claim 6 wherein the lay-up process performed by the computer programmed winding machine causes the bands of each full length ply to be an integrated layer in which the bands are interwoven.

8. The method of manufacturing a helicopter rotor flexbeam according to claim 6 including the step of debulking the preplies so laid up in unison while still on the dodecahedron lay-up tool.

9. The method of manufacturing a helicopter rotor flexbeam according to claim 8 wherein after demolding the cured flexbeam is deflashed.

10. The method of manufacturing a helicopter rotor flexbeam according to claim 9 including the step of ultrasonically inspecting the cured flexbeam following demolding thereof.

11. The method of manufacturing a helicopter rotor flexbeam according to claim 10 including the additional step of curing the overwrap windings.

12. The method of manufacturing a helicopter rotor flexbeam according to claim 11 and including the additional step of profile machining the overwrap winding and chambering the leg ends.

13. The method of manufacturing a helicopter rotor flexbeam according to claim 12 and including the additional step of bonding snubber pads onto each leg of the flexbeam and antifret shims at a top and bottom of the flexbeam hub and the leg inner ends.

14. The method of manufacturing a helicopter rotor flexbeam according to claim 13 including the additional step of debulking the first and second preplies prior to final lay-up.

15. The method of manufacturing a helicopter rotor flexbeam according to claim 1 including laying up selectively shaped filler plies comprising a plurality of unidirectional graphite and fiberglass fibers cut to fit into the interstices created by the bifurcating of the full length plies in passing through the hub.

16. The method of manufacturing a helicopter rotor flexbeam according to claim 1 wherein the lay-up of the composite materials of the various plies to form the flexbeam takes place on ten of the twelve facets of the lay-up tool and so that the composite material plies so laid up on all ten facets are shaped to cooperate to form a flexbeam of desired shape during the curing process.

17. The method of manufacturing a helicopter rotor flexbeam according to claim 16 wherein the short length taper plies and the graphite taper plies are individually laid up on the full length taper plies during the final lay-up of the composite materials on the dodecahedron lay-up tool.

* * * * *

UNITED STATES PATENT AND TRADEMARK OFFICE
CERTIFICATE OF CORRECTION

PATENT NO. : 5,091,029
DATED : February 25, 1992
INVENTOR(S) : Geoffrey C.R. Davis Et Al It is certified that error appears in the above-identified patent and that said Letters Patent is hereby corrected as shown below:

Column 2, line 11, "thereabouts" should read --thereabout--

Claim 1, column 11, line 60, delete "p2" and consider the phrase beginning "(4) cutting the plies" as a new paragraph Claim 1, column 12, line 11, "substantially" should read --substantial--

Claim 1, column 12, line 25 "affecting" should read --effecting--

Claim 1, column 12, line 64, "radical" should read --radial--

Claim 1, column 13, line 17, "±60°" should read --+65°--

Claim 2, column 13, line 30, "affect" should read --effect--

Claim 12, column 14, line 25 "chambering" should read

--chamfering--

Signed and Sealed this

Second Day of November, 1993

Attest:

BRUCE LEHMAN

Attesting Officer     Commissioner of Patents and Trademarks